May 21, 1946.　　　　　E. F. KOHL　　　　　2,400,831
IMPERMANENT PATTERNS AND THE METHOD OF PREPARING MOLDS
Filed Aug. 25, 1943　　　3 Sheets-Sheet 1
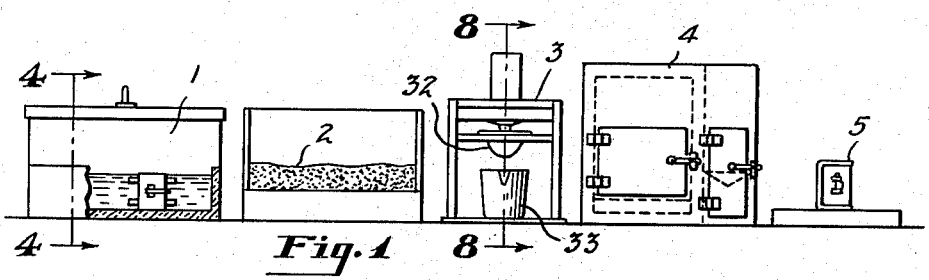
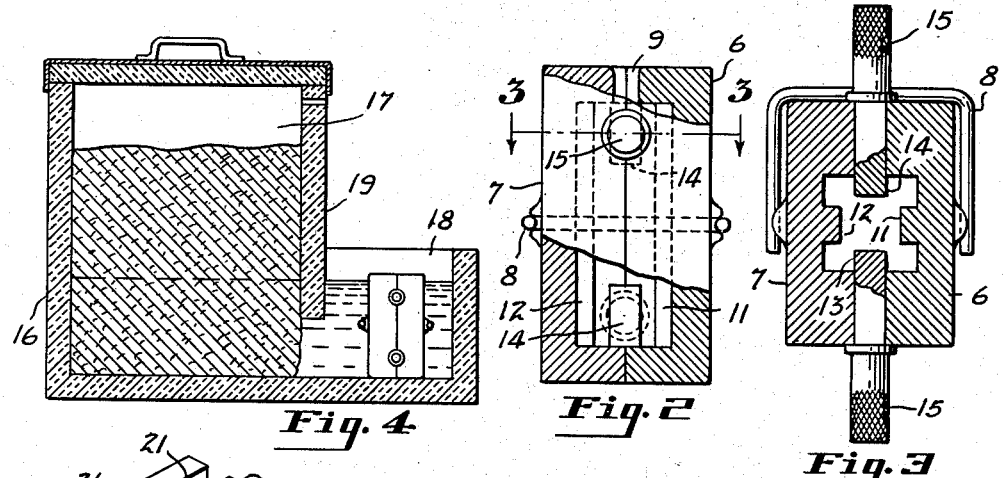
INVENTOR
Everard F. Kohl
BY John Mahoney
ATTORNEY May 21, 1946. E. F. KOHL 2,400,831
IMPERMANENT PATTERNS AND THE METHOD OF PREPARING MOLDS
Filed Aug. 25, 1943 3 Sheets-Sheet 2

INVENTOR
Everard F. Kohl
BY John Mahoney
ATTORNEY

May 21, 1946.  E. F. KOHL  2,400,831
IMPERMANENT PATTERNS AND THE METHOD OF PREPARING MOLDS
Filed Aug. 25, 1943  3 Sheets-Sheet 3

INVENTOR
Everard F. Kohl
BY John Mahoney
ATTORNEY

Patented May 21, 1946

2,400,831

UNITED STATES PATENT OFFICE 2,400,831

IMPERMANENT PATTERN AND THE METHOD OF PREPARING MOLDS

Everard F. Kohl, Cleveland, Ohio

Application August 25, 1943, Serial No. 500,190

19 Claims. (Cl. 22—164)

My invention relates to an improved method of preparing molds and more particularly to the method of preparing molds of the nonpartible type having intricate or irregularly shaped cavities or matrices. It also relates to an improved pattern of the impermanent or disposable type and to its method of production.

In preparing nonpartible molds for metal casting purposes, it has heretofore been the practice to prepare a pattern from a material which is in the solid state at normal temperatures, such as wax or a metal having a low melting point, which is invested in a material capable of forming a mold suitable for the metal which it is desired to cast. The investment material is then dried in a furnace and subjected to sufficient heat to melt the wax or metal which is removed from the mold to provide a cavity or matrix in which the metal is poured to form the final casting.

In preparing nonpartible molds by such methods, however, the results have not been entirely satisfactory. Wax is comparatively soft and because of its structural weakness, impermanent patterns formed therefrom must be limited in size, are subject to distortion, and must be invested in a soft material. In making impermanent patterns from metals having a low melting point, it is necessary to cast the impermanent patterns under heavy pressure, such as by the die casting method, to impart the full fineness of detail of the master mold, which increases the cost of production.

The principal objection, however, to the use of patterns formed of wax or metals having a low melting point resides in the time required and the loss sustained in recovering the wax or metal from the final mold. Upon melting the pattern under heat, the surface tension of the liquefied material is too low to permit recovery of all the pattern material and it is therefore necessary to volatilize the remainder of the wax or metal at a comparatively high temperature which is not only time consuming but in such processes, it is impractical to recover all of the costly pattern material. The temperature required to volatilize the last remnants of the pattern material also adversely affects the mold material and this is particularly true when the mold is of a comparatively large size.

It is the aim of the present invention to provide an improved method of preparing nonpartible molds from patterns formed of a material which is in the liquid state at ambient temperatures prevailing in foundries, such as at temperatures ranging from considerably below zero to summer heat. Preferably, I utilize a material which is in the liquid state at normal temperatures and in which the change of state from a liquid to a solid takes place considerably below normal temperatures and which solidifies or freezes at a temperature at which the pattern may be handled. Various materials may be utilized, such as mercury, liquid alloys of sodium and potassium, amalgams of mercury which are liquid at mold working temperatures, such as an amalgam of mercury with a small proportion of cadmium, zinc or silver. It will be noted that most of these are liquid at normal temperatures and freeze at temperatures considerably below zero degree centigrade.

I preferably utilize mercury in a comparatively pure state because it has characteristics which render it particularly suitable for this purpose, although I do not desire to be limited in this respect as the mercury may contain impurities, either in solution or suspension or amalgamated therewith, providing they do not adversely affect the physical properties of the mercury which render it especially desirable for the purpose.

In making impermanent patterns utilized in casting metals, I have found that mercury is particularly suitable because it has a high surface tension which permits it to flow readily from ordinary molds, thus enabling full recovery of the impermanent pattern from ordinary molds, and it volatilizes at temperatures of 700° Fahrenheit or below and condenses readily, thereby enabling the pattern material to be completely recovered even from complicated molds without injury to the mold structure.

Mercury also has a high specific gravity and is mechanically subdivisible into near molecular size particles, which eliminates the need for centrifugal or pressure casting of impermanent patterns to obtain proper registry of the master mold details. It also has lubricating properties and consequently will not adversely affect the intricate interstices of master molds nor disturb the inner walls of the final casting mold. The master mold will therefore have a comparatively long life in service and accurate castings may be produced in the final mold.

Mercury also has a cleaning action on the surface of the mold and may be readily purified by a simple straining operation so that a small amount of the pattern material is sufficient for large scale production.

In addition, mercury has thermal properties, which render it particularly desirable as an impermanent pattern in casting processes. For instance, it has a low thermal coefficient of expansion that approximates zero as the material solidifies, thus insuring detail registry of the mercury in the master mold and permitting ready withdrawal of the mercury pattern from the master mold even though the impermanent pattern has cross linear or threaded inserts. Mercury also has a high coefficient of thermal conductivity. This feature is of particular importance because it shortens the production cycle and because in forming the final mold, the mercury in the interstices of the mold melts first and in view of its high surface tension, the melted mercury holds the heart of solid mercury in buoyant suspension and consequently there is no disturbance of the delicate interstices of the molds. This characteristic also enables sprues to be added integrally to the pattern after it is removed from the master mold, or the pattern may be worked, repaired, or sectional patterns may be cast in separate master molds, and bound together by mercury dowel pins or by fusion.

Mercury in its frozen state also has good surface hardness and high physical strength which minimizes loss of surface detail and distortion of dimensional accuracy during the handling of the solid pattern throughout the casting cycle. This feature also enables it to be invested in commercially available investment material, such as molders sand, and the investment material may be packed or rammed tightly against the pattern surface and consequently there is no limit to the physical dimensions of the mold and final castings which may be produced.

It is therefore an object of my invention to provide an improved process of producing molds.

Another object of my invention is to provide an improved impermanent or disposable pattern for use in preparing molds and the method of producing such patterns.

A further object of my invention is to provide an improved process of producing molds having complicated or irregularly-shaped matrices by the use of impermanent or disposable patterns.

In practicing my invention one method is illustrated in the accompanying drawings. It will be understood, however, that the apparatus shown is merely for the purpose of illustration and is not to be considered in any manner as being limiting.

In the drawings:

Fig. 1 is a composite view illustrating the various steps in my improved process;

Fig. 2 is partly an end view and partly a sectional view of a master mold for forming an impermanent pattern;

Fig. 3 is a cross sectional view on the line 3—3, Fig. 2;

Fig. 4 is a cross sectional view on the line 4—4 of Fig. 1 of a refrigerating apparatus with the mold shown in elevation;

Fig. 5 is a perspective view of a completed pattern, the pattern being in the solid frozen state;

Fig. 6 is an elevational view of a flask for the frozen pattern and investment material, parts of the flask being broken away to show the upper portions of the pattern and investment material;

Fig. 7 is a cross sectional view on the line 7—7 of Fig. 6;

Fig. 8 is a cross sectional view on the line 8—8 of Fig. 1 of the mercury purifying apparatus with parts in elevation and showing the flask inverted to permit the mercury to drain from the final mold;

Figure 9:
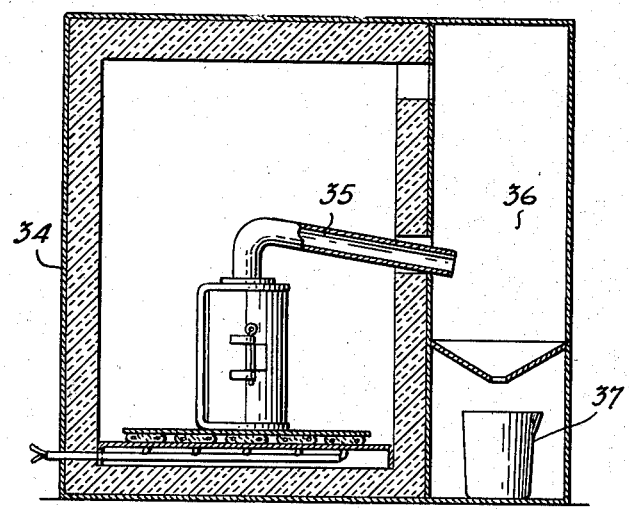
Fig. 9 is a sectional view of a retort or oven for heating the final mold material and volatilizing the last remnants of the liquid.

Although, as previously stated, in forming my improved pattern and nonpartible mold, various materials which are in the liquid state at ambient temperatures at which the mold is formed may be utilized, to simplify the description mercury will be specifically mentioned.

Briefly stated, in forming molds by my improved method, a master mold having a suitable gate is first prepared in the usual manner and is inserted in a suitable refrigerating apparatus which is capable of freezing the mercury. Mercury in its normal liquid state is then poured into the mold cavity and is frozen. The frozen mercury pattern is removed from the master mold, placed within a flask and invested with a moldable investment material which is capable of setting to form the final mold. The mercury is then permitted to liquefy and is drained from the mold to form a cavity or matrix similar to the mercury pattern. The mold may then be dried in a suitable oven or retort and the metal to be cast is poured or otherwise cast into the mold, whereupon the mold is destroyed to retrieve the final casting as in ordinary molding operations.

The general operation of my improved process is illustrated in Fig. 1 of the drawings in which the numeral 1 indicates a refrigerating apparatus, 2 the investment material, 3 the apparatus for purifying the mercury, 4 the retort or oven, and 5 the final nonpartible mold in which the desired metal castings are formed.

Figs. 2 to 10, inclusive, illustrate more particularly the method of preparing an impermanent pattern formed of frozen mercury and the steps involved in preparing the final mold. As illustrated in Figs. 2 and 3, a partible master mold is formed consisting of a drag 6 and a cope 7 which are held together by any suitable means, such as a spring 8, the mold being provided at its parting line with a gate 9. In the mold illustrated, it will be noted that both the drag and cope are provided interiorly with longitudinally extending embossments 11 and 12 for providing grooves in the pattern and the mold is also provided with a pair of rectangularly-shaped inserts 13, only one of which is shown, extending through one side of the mold at the parting line into opposite ends of the mold cavity, and a similar pair of rectangularly-shaped inserts 14 extend into the mold cavity from the opposite side of the mold. The inserts are provided with handles 15 for convenient removal from the pattern which is subsequently formed. It will, of course, be understood that inserts 11, 12, 13 and 14 may be of any desired form. For instance, they may be threaded to form threaded apertures in the pattern.

In forming the frozen pattern, the mold is inserted in a suitable refrigerating apparatus capable of freezing mercury and the mercury in its normal liquid state is then poured into the cavity or matrix of the mold through gate 9. Any suitable refrigeration apparatus may be utilized for this purpose. As illustrated in the drawings, a container 16 formed of heat insulating material is provided which is divided into intercommunicating chambers 17 and 18 by means of a partition 19 which terminates a short distance from the bottom. The chamber 17 contains solid carbon dioxide and is immersed in a liquid having a low freezing point, such as acetone or ethylene dichloride, which is free to flow into chamber 18 where it contacts the mold and freezes the mercury.

As illustrated in the drawings, the low boiling point liquid does not cover the entire mold, the gate being free to receive the mercury. It is immaterial, however, whether this liquid seeps into the mold cavity as, in any event, it will be displaced by the heavier mercury, and it is even within the scope of my invention to submerge the entire mold in the low boiling point liquid and pour the mercury into the mold cavity through the comparatively light liquid; in fact, the latter method has some advantages because when a low boiling point liquid, and particularly acetone, is displaced in the mold by the mercury, the withdrawal of the frozen mercury pattern from the mold is facilitated.

After the mercury is frozen, the mold containing the mercury is withdrawn from the liquid bath, spring 8 is removed, the mold is parted, and inserts 13 and 14 are removed to form a frozen mercury pattern, as illustrated in Fig. 5 of the drawings.

Because of the high specific gravity of the mercury and its divisibility into near molecular size particles, it is not necessary to cast the mercury under high pressure to obtain proper registry of the mold details and in view of its lubricating properties, it does not in any manner affect the embossments or inserts placed in the cavity of the mold. The master mold will therefore have a long life in service. Since the mercury has a low thermal coefficient of expansion which approaches zero when the mercury solidifies, it is also apparent that the inserts 13 and 14 may be readily removed from the frozen mercury pattern. As illustrated in the drawings, the angularly-shaped embossments form grooves 20 in the pattern which are complements of the embossments, and the inserts form rectangularly-shaped slots 21, which are complements of the inserts.

Upon removal from the mold, the mercury pattern has considerable stability, good surface hardness and high physical strength, and is invested in a composition suitable for making a mold in which the final castings may be made, such as molders sand.

In preparing the final mold, the mercury pattern is placed in a flask 22 which may be of any suitable form. As illustrated in the drawings, it has two arcuate-shaped side parts 23 and 24 hinged at 25 which are secured together opposite the hinge by a pin 26. The upper and lower portions of the flask are formed of plates or disks 27 and 27a secured together by a spacer 28, the upper disk 27 being provided with an opening 29 through which the investment material may be inserted and in view of the high surface hardness of the mercury pattern in its frozen state, the investment material or composition may be packed or rammed tightly around the pattern.

After the investment composition sets, the impermanent mercury pattern is permitted to melt, the sprue 30 forming a gate in the mold. The melting of the mercury pattern may take place at the temperature of the ambient atmosphere prevailing in the foundry, or the flask may be conveyed into a warm room, or even heat may be applied to expedite the melting of the mercury pattern. The flask 22 is then inverted as illustrated in Fig. 8 and the mercury is permitted to drain from the flask. The mercury may be conveniently purified by passing it through a screen 31 and a filter 32 into a container 33. In view of the high surface tension of mercury, it will all drain from ordinary molds, but if the mold is complicated, it may be necessary to volatilize the last remnants of the mercury. This may be conveniently effected during the drying of the mold, as illustrated more particularly in Fig. 9 of the drawings, in which the numeral 34 designates an oven or retort in which the flask 22 containing the final mold is placed. It will be particularly noted that when wax or metals having a low melting point are volatilized from the mold, it is necessary to heat the mold to a high temperature which adversely affects the mold structure. When impermanent mercury patterns are utilized, however, in forming the mold, it is only necessary to heat the mold to a temperature of about 700° Fahrenheit to recover the last remnants of the mercury, which is approximately the temperature required to dry and harden the mold. As illustrated in Fig. 9, the volatilized mercury may be passed through a suitable stack 35 extending into a condensing chamber 36 where it readily condenses and is collected in the container 37.

Figure 10:
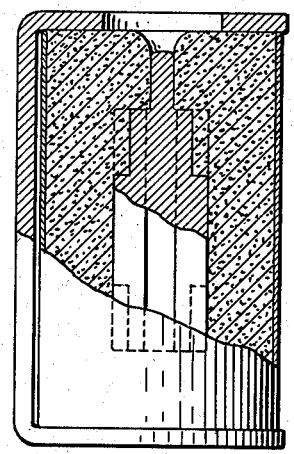
Fig. 10 is a cross sectional view of the final mold with parts in elevation.

The mold is then removed from the furnace and the metal is cast in the mold cavity from which the mercury pattern was removed as indicated in Fig. 10. The final casting of the metal may be effected in any desirable manner, such as by pouring or by centrifugal or pressure casting. The flask may then be removed from the mold and the mold destroyed to retrieve the final casting as in ordinary practice.

In view of the high thermal conductivity of solid frozen mercury patterns, they permit additional amounts of pattern material in the liquid state to be readily fusible to the pattern material in the solid state so that after the solid mercury pattern is removed from the master mold, sprues may be added integrally at any point of the pattern to suit the final mold-casting requirement, or separate patterns may be cast in separate master molds and the sections bound together by fusion or by dowel pins made of the same pattern material and the integrated pattern with the dowels and sectional lines will fuse into one continuous mass and can be invested as one pattern.

Figures 11, 12:
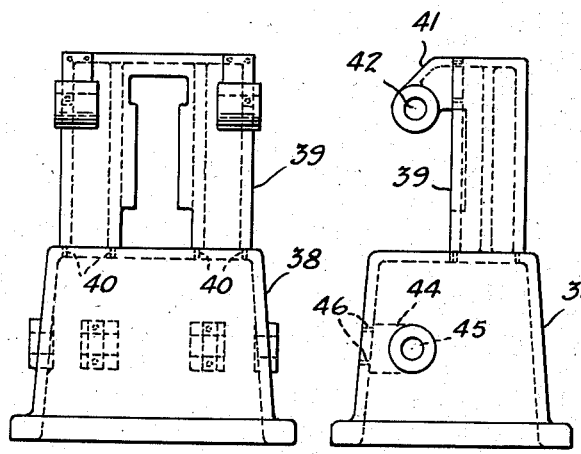
Fig. 11 is a front elevational view illustrating a composite impermanent pattern built up from a plurality of impermanent patterns.
Fig. 12 is a side elevational view of the pattern shown in Fig. 11.
Figure 13:
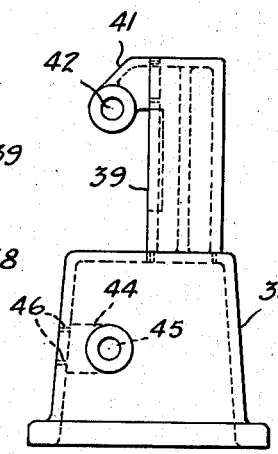
Fig. 13 is a side elevational view of the upper part of the pattern shown in Figs. 11 and 12 before the brackets have been added.
Figure 14:
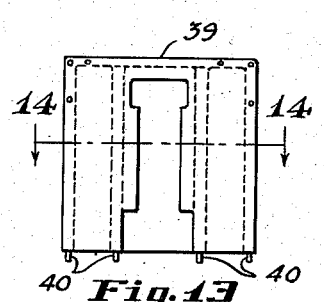
Fig. 14 is a cross sectional view on the line 14—14 of Fig. 13.
Figure 15:
Figs. 15 and 16 are elevational views of small impermanent patterns which are formed separately and are attached to other impermanent patterns to form the composite pattern shown in Figs. 11 and 12.
Figure 16:
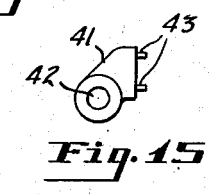

An example of a complicated frozen mercury pattern is illustrated in Figs. 11 and 12 with parts of the pattern being shown separately in Figs. 13 to 16, inclusive, of the drawings. As shown in Figs. 11 and 12, the mercury pattern is formed of a base 38 to which a slide 39 formed of a separate mercury pattern is attached by means of dowel pins 40. The dowel pins may be formed integrally on the slide 39 and holes may be formed in the base 38 during the formation of the mercury patterns and the parts will fuse together. Other additions may also be made in a similar manner. For instance, a pair of mercury patterns in the form of a bearing bracket having an opening 42 therein and dowel pins 43 may be formed in a separate master mold and the dowel pins may be inserted in suitable apertures formed in the slide 39 as shown more particularly in Fig. 12. In a like manner, separate mercury patterns in the form of bearing brackets 44, having an opening 45 and dowel pins 46 may be attached to the base with the dowel pins extending through apertures in the base, as shown more particularly in Figs. 11 and 12 of the drawings. When the composite mercury pattern is completed, it may be invested in a suitable investment composition capable of forming the final mold for casting metal in the manner previously described for the pattern shown in Fig. 6.

Figure 17:
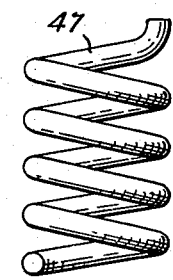
Fig. 17 is an elevational view of a solidified or frozen pattern in the form of a spring.
Figure 18:
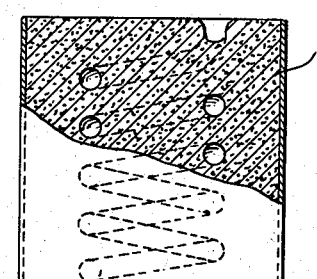
Fig. 18 is a view partly in elevation and partly in section of the final mold for casting the spring, the impermanent pattern for which is shown in Fig. 17.

In view of the unique characteristics of mercury in the frozen state, various other patterns may be made therefrom, such as shown in Fig. 17. For instance, a pattern in the form of a wire or rod may be frozen in a master mold and after the mercury pattern is removed and exposed to the air for a short time at a temperature which causes the mercury to approach its melting point, it becomes ductile and may be wrapped around a mandrel to form a mercury pattern in the form of a spring 47 as shown in Fig. 17 of the drawings. The mercury pattern, thus formed, may be invested in a moldable composition, such as molders sand. The mold is then allowed to set and after the mercury melts, it may be drained from the mold 48 to form a cavity into which the final metal casting may be made after the mold material has been hardened in the usual manner.

Figure 19:
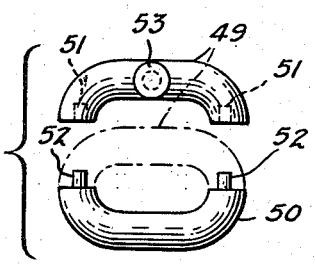
Fig. 19 is an elevational view of two frozen patterns, the upper pattern being shown in full lines as formed and in dotted lines as assembled to form a composite pattern with the lower pattern.
Figure 20:
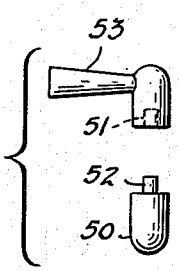
Fig. 20 is an end elevational view of the patterns shown in Fig. 19.

Figs. 19 to 23, inclusive, show the method of forming a chain by my improved process. As illustrated in Figs. 19 and 20, frozen mercury patterns 49 and 50 are shown. The upper pattern is frozen in a master mold with recesses 51 and the lower pattern is frozen in a master mold with dowel pins 52. In Fig. 19 the upper pattern is shown in dotted lines as assembled on the lower pattern with the dowel pins 52 extending into the recesses in pattern 49 to form a link. The upper pattern as frozen includes a sprue 53 to form a gate in the final mold.

Figure 21:
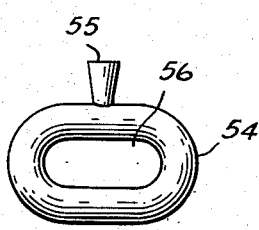
Fig. 21 is a side elevational view of a frozen pattern in the form of a chain link.

A frozen mercury pattern in the form of the other link of the chain is illustrated in Fig. 21 and designated by the numeral 54. It is also provided with a sprue 55. The patterns 49, 50 and 54 may be formed in a manner similar to the pattern shown in Fig. 6.

In forming the chain the parts 49 and 50 when assembled in composite form extend through openings 56 in two spaced links 54, as many of the links being utilized as is required to form the complete chain.

Figure 22:
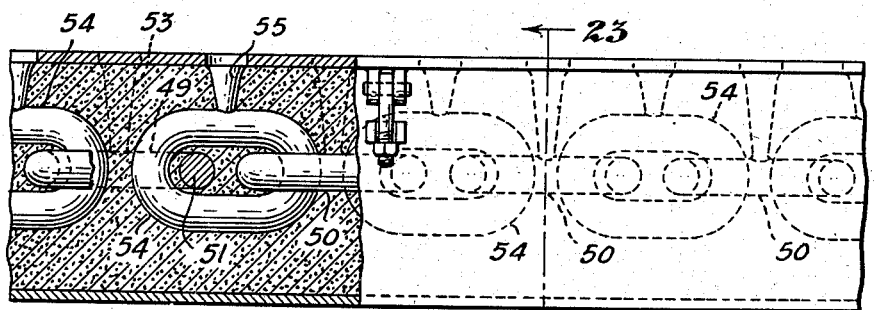
Fig. 22 is a plan view of the frozen pattern links assembled in the form of a chain and invested in molders sand.
Figure 23:
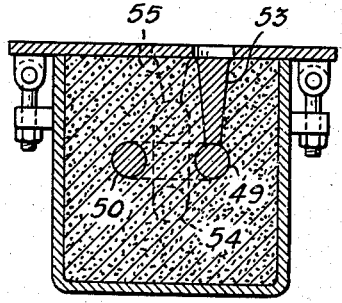
Fig. 23 is a cross sectional view on the line 23—23 of Fig. 22.

The composite mercury pattern thus formed is invested in molders sand as shown in Fig. 22, care being exercised to see that sand is interposed between the separate links. The mercury is then permitted to liquefy, the mold is inverted to drain the mercury from the sand, and a nonpartible mold is produced into which metal to form the final chain may be poured. The mold is then destroyed to retrieve the chain as in usual foundry practice.

Figure 24:
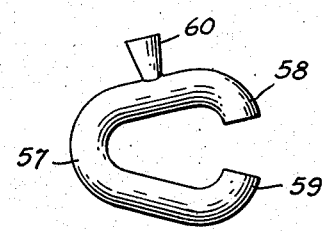
Fig. 24 is an elevational view of a frozen pattern in the form of a link with portions of the link spaced from each other to receive an additional link.
Figure 25:
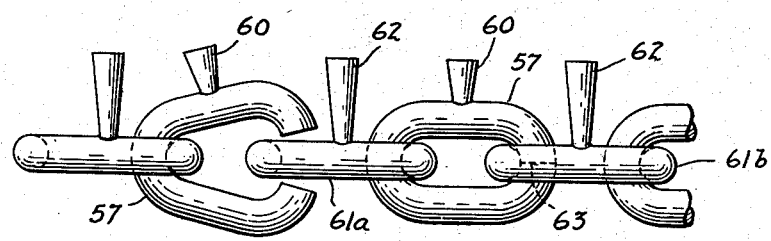
Fig. 25 is an elevational view of a frozen pattern with the links assembled and an additional link in position to be assembled.

Another method of preparing a frozen mercury pattern in the form of a chain is illustrated in Figs. 24 and 25 of the drawings. In this modification, a series of mercury patterns 57 with two end portions 58 and 59 spaced from each other and provided with a sprue 60, is formed as shown in Fig. 24 of the drawings, the frozen mercury patterns being prepared in a master mold in the manner previously described. An additional series of patterns formed of frozen mercury is also prepared in the form shown in Fig. 25 of the drawings, these links being designated by the numerals 61a and 61b, each of which is provided with a sprue 62. The links formed of frozen mercury may be assembled by inserting one arm of link 57 through the opening in a link 61a and also through the opening in a spaced link 61b as shown in Fig. 25. In view of the ductile and adhesive nature of the frozen mercury when exposed to the air for a short period at a temperature which will cause the mercury to approach its melting point, end portions 58 and 59 may then be readily forced together as indicated by the line 63 and will adhere to each other to form a closed link. A chain of any desired length may thus be formed. The chain is then invested in molders sand as shown in Fig. 22 and after the mold sets and the mercury liquefies, it is poured from the mold to form a cavity or matrix in which the desired metal may be cast.

What I claim is:

1. The method of preparing patterns for use in producing molds which comprises introducing into a master mold a material composed predominantly of mercury which is liquid at normal temperatures, freezing the liquid to form a pattern, and removing the frozen pattern from the master mold.

2. The method of preparing patterns for use in producing molds which comprises introducing mercury into a master mold, freezing the mercury to form a pattern, and then removing the frozen pattern from the master mold.

3. The method of preparing patterns for use in producing molds which comprises introducing mercury into a lubricated master mold, freezing the mercury, and then removing the frozen mercury pattern from the master mold.

4. The method of preparing frozen patterns in the form of a spring which comprises introducing a material composed predominantly of mercury which is liquid at normal temperatures in a mold having a cavity in the form of a wire or rod, freezing the liquid to form a pattern, removing the pattern from the mold, and wrapping it around a mandrel to form a spring.

5. The method of preparing composite patterns which comprises introducing into a master mold a material composed at least predominantly of mercury which is liquid at normal temperatures, freezing the liquid to form a pattern, removing the frozen pattern from the mold, and uniting the pattern thus formed with another pattern formed in the same manner.

6. The method of preparing a frozen pattern which comprises freezing in a master mold having a cavity in the form of a link a material composed predominantly of mercury which is liquid at normal temperatures, freezing a like material in separate molds having cavities in the shape of half a link, removing the frozen patterns from the molds, threading the two half links through the opening in the whole link, and uniting the adjacent ends of the half links to form a composite pattern.

7. The method of preparing a frozen pattern which comprises freezing in a master mold having a cavity in the form of a link a material composed at least predominantly of mercury which is liquid at normal temperatures, freezing a like material in a separate mold having a cavity in the form of a link with open ends, removing the frozen patterns from the mold, inserting the complete link through the opening between the adjacent ends of the other link, and then uniting the adjacent ends of the open link to form a composite pattern.

8. A frozen pattern for use in preparing molds which is composed predominantly of mercury.

9. An irregularly-shaped composite pattern in the frozen state which is composed predominantly of mercury.

10. A frozen pattern for use in preparing molds which is composed of mercury and minor impurities.

11. A frozen pattern in the form of a spring which is formed of a material composed at least predominantly of mercury.

12. A frozen pattern in the form of a chain link which is formed of a material composed at least predominantly of mercury.

13. A frozen pattern in the form of a chain which is formed of a material composed at least predominantly of mercury.

14. The method of preparing molds which comprises introducing into a master mold a liquid composed predominantly of mercury, freezing the liquid in the mold to form a pattern, removing the frozen pattern from the master mold, investing the pattern in its frozen state with a moldable composition, subjecting the mold to a temperature at which the pattern will liquefy, and then removing the liquid from the final mold.

15. The method of preparing nonpartible molds which comprises introducing into a master mold a liquid composed predominantly of mercury, freezing the liquid in the mold to form a pattern, removing the frozen pattern from the master mold, investing the pattern in its frozen state with a moldable composition, subjecting the mold to a temperature at which the pattern will liquefy, and then removing the liquid from the final mold.

16. The method of preparing nonpartible molds which comprises introducing into a master mold a liquid composed at least predominantly of mercury, freezing the liquid in the mold to form a pattern, removing the frozen pattern from the master mold, investing the pattern in its frozen state with a moldable silicious material, subjecting the mold to a temperature at which the pattern will liquefy, and then removing the liquid from the final mold.

17. The method of preparing nonpartible molds which comprises introducing into a master mold a material composed at least predominantly of mercury which is liquid at normal temperatures, freezing the liquid to form a pattern, removing the frozen pattern from the mold, uniting the pattern thus formed with another pattern formed in the same manner, investing the composite pattern in its frozen state with a moldable silicious material, subjecting the mold to a temperature at which the pattern will liquefy, and then removing the liquid from the final mold.

18. The method of preparing a destructible mold for molding an article requiring the destruction of the mold to retrieve the article which comprises introducing into a master mold having the shape of the desired article a material composed predominantly of mercury which is liquid at normal temperatures, freezing the liquid in the mold to form of the liquid a frozen pattern conforming to the shape of the desired article, investing the frozen pattern with a moldable composition to form a destructable mold, subjecting the frozen pattern in the destructable mold to sufficient heat to liquefy the frozen pattern, and then removing the liquid of the pattern body from the destructable mold so formed.

19. In a system for preparing destructable molds for forming articles, a frozen body composed predominantly of mercury having the shape of the desired article and which body liquefies at normal temperatures.

EVERARD F. KOHL.